(12) United States Patent
DiCroce (10) Patent No.: US 7,463,135 B2
(45) Date of Patent: Dec. 9, 2008

(54) SELECTABLE PRELOAD VEHICLE SECURITY SYSTEM

(75) Inventor: John DiCroce, Oceanside, NY (US)

(73) Assignee: Audiovox Corporation, Hauppauge, NY (US)

( * ) Notice: Subject to any disclaimer, the term of this patent is extended or adjusted under 35 U.S.C. 154(b) by 253 days.

(21) Appl. No.: 11/365,651

(22) Filed: Mar. 1, 2006

(65) Prior Publication Data

US 2006/0197380 A1 Sep. 7, 2006

Related U.S. Application Data

(60) Provisional application No. 60/657,979, filed on Mar. 2, 2005.

(51) Int. Cl.
*B60R 25/10* (2006.01)
*B60R 25/00* (2006.01)

(52) U.S. Cl. .................................. 340/426.36; 180/287

(58) Field of Classification Search ............ 340/426.36, 340/426.1, 427, 428, 426, 425.5, 531, 5.72, 340/5.2, 5.7; 701/100; 307/10.2; 180/287
See application file for complete search history.

(56) References Cited

U.S. PATENT DOCUMENTS

| | | | | |
|---|---|---|---|---|
| 5,534,845 A | * | 7/1996 | Issa et al. | 340/425.5 |
| 5,905,431 A | * | 5/1999 | Mueller et al. | 340/426.17 |
| 6,141,710 A | * | 10/2000 | Miesterfeld | 710/100 |
| 6,529,124 B2 | * | 3/2003 | Flick | 340/426.1 |
| 6,801,119 B1 | * | 10/2004 | Flick | 340/5.72 |

* cited by examiner

*Primary Examiner*—Jeff Hofsass
*Assistant Examiner*—Sigmund Tang
(74) *Attorney, Agent, or Firm*—F. Chau & Associates, LLC (57) ABSTRACT

A multi-mode vehicle security system is provided. The system comprises: a control module wirelessly selectable to operate in one of a plurality of modes; and a function module for receiving a command from the control module and instructing a vehicle device to perform a function associated with the command.

19 Claims, 9 Drawing Sheets

SELECTABLE PRELOAD VEHICLE SECURITY SYSTEM

CROSS-REFERENCE TO RELATED APPLICATION

This application claims the benefit of U.S. Provisional Application No. 60/657,979, filed Mar. 2, 2005, the disclosure of which is herein incorporated by reference.

BACKGROUND OF THE INVENTION

1. Technical Field

The present invention relates to vehicle security systems, and more particularly, to a selectable preload security system for a vehicle.

2. Discussion of the Related Art

Many vehicles sold by a car dealership include security systems for performing various security-related functions, such as switching between armed and disarmed modes in response to a remote transmitter. These systems are either preloaded into the vehicle by the vehicle manufacturer or provided by an aftermarket vendor.

Consumers typically purchase a security system with a vehicle. However, if a consumer decides not to purchase a security system, the system is removed from the vehicle or disabled. In order to remove the system from the vehicle, a full-time technician must be employed by the car dealership, thus resulting in increased dealership overhead. Similarly, if the security system is disabled, the system components remain in the vehicle and the dealership absorbs the costs associated with the system.

As vehicle security systems have evolved, they have become more attractive to consumers. For example, newer security systems can be programmed according to a consumer's preference. In addition, security systems with enhanced options or multiple-vehicle capabilities are available. However, if these systems are installed in a vehicle prior to its sale they must also be removed or disabled, thus having similar drawbacks as conventional systems.

Accordingly, a need exists for a vehicle security system capable of being configured according to a consumer's preference that can be installed in all vehicles on a dealership lot and easily disconnected from the vehicle.

SUMMARY OF THE INVENTION

In one embodiment of the present invention, a multi-mode vehicle security system comprises: a control module wirelessly selectable to operate in one of a plurality of modes; and a function module for receiving a command from the control module and instructing a vehicle device to perform a function associated with the command.

The control module operates in one of a vehicle security mode, a remote keyless entry (RKE) mode or a shock sensor mode. The vehicle security system further comprises a remote controller for selecting an operating mode of the control module.

In another embodiment of the present invention, a control module for use with a vehicle security system comprises: an indicator for indicating an operating mode of the control module; a memory comprising codes associated with a plurality of features of the control module; and a transceiver for receiving an instruction to operate the control module in one of a vehicle security mode, RKE mode or shock sensor mode and for receiving programming information defining a plurality of features of the control module.

The indicator is a lens system comprising a plurality of LEDs. The memory is one of an EPROM, EEPROM, RAM, SDRAM or DRAM. The control module further comprises: a connecting port for connecting the control module to a function module, wherein the function module is connected to a plurality of vehicle devices. The memory further comprises codes associated with a plurality of features of the function module and the vehicle devices. The control module further comprises: an adjustable shock sensor; a jumper insert; and a programming switch.

When an ignition key of a vehicle is turned on and the programming switch is pressed and released, and then, the ignition key is turned off the control module is capable of being programmed. When a first jumper, which is associated with the operating mode of the control module, is inserted into the jumper insert the control module is programmed in response to the programming information. When a second jumper is inserted into the jumper insert the control module is deactivated.

The control module further comprises an external memory interface for receiving programming information defining a plurality of features of the control module and the function module.

In yet another embodiment of the present invention, a selectable and programmable preload vehicle security system comprises: a control module wirelessly selectable to operate in one of a vehicle security mode, an RKE mode or a shock sensor mode and programmable in response to programming information defining a plurality of features of the control module; and a first function module for receiving commands from the control module and instructing vehicle devices to perform functions associated with the commands.

The vehicle security system further comprises a remote controller for selecting an operating mode of the control module and for programming a plurality of features of the control module and the first function module.

The first function module comprises: a first connector port for receiving data from and transmitting data to the control module; a second connector port for connecting the first function module to a second function module; and a plurality of wiring harnesses for connecting the first function module to the vehicle devices.

The vehicle security system further comprises: a detection circuit for detecting a complete or partial connection or disconnection of the control module or the second function module to or from the first function module; a telematic wiring harness for receiving telematic upgrades; an intelligent transportation system data bus (IDB) wiring harness for connecting to an IDB module; and a storage bracket for securing the control module inside a vehicle.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

DETAILED DESCRIPTION OF EXEMPLARY EMBODIMENTS

Figure 1:
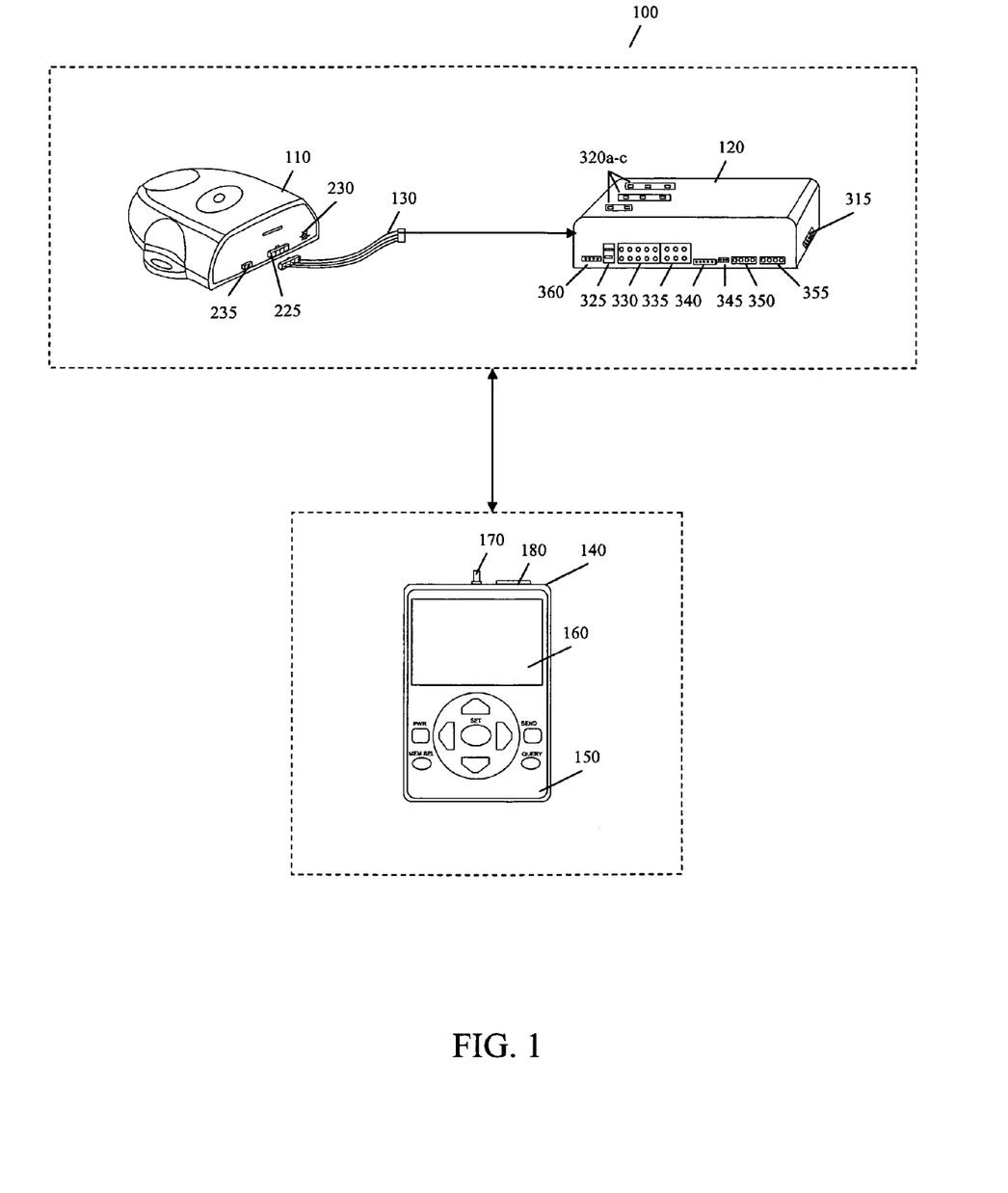
FIG. 1 is a diagram of a selectable preload vehicle security system according to an exemplary embodiment of the present invention.

FIG. 1 is a diagram of a selectable preload vehicle security system 100 according to an exemplary embodiment of the present invention. As shown in FIG. 1, the vehicle security system 100, which may be an aftermarket or factory installed RKE, start or alarm system, upgrade or enhancement thereto, includes a control module 10 connected to a function module 120. The control module 10 is connected to the function module via a data connector 130. The vehicle security system 100 further includes a remote programmer 140 for remotely programming the control module 110.

The control module 10 is configured such that it may be installed under the dashboard of a vehicle in a manner to be easily accessible to a consumer or car dealership personnel. For example, the control module 110 may be inserted into a storage bracket 510 (shown in FIG. 5) that is secured to a bottom portion of the dashboard. Thus, in the event the vehicle security system 100 is not sold, the control module 110 can be easily removed from the vehicle. The function module 120 is configured such that it is also installed under the dashboard, albeit in a more inconspicuous location. Thus, in the event the vehicle security system 100 is not sold, the function module 120 may remain in the vehicle.

Figure 2:
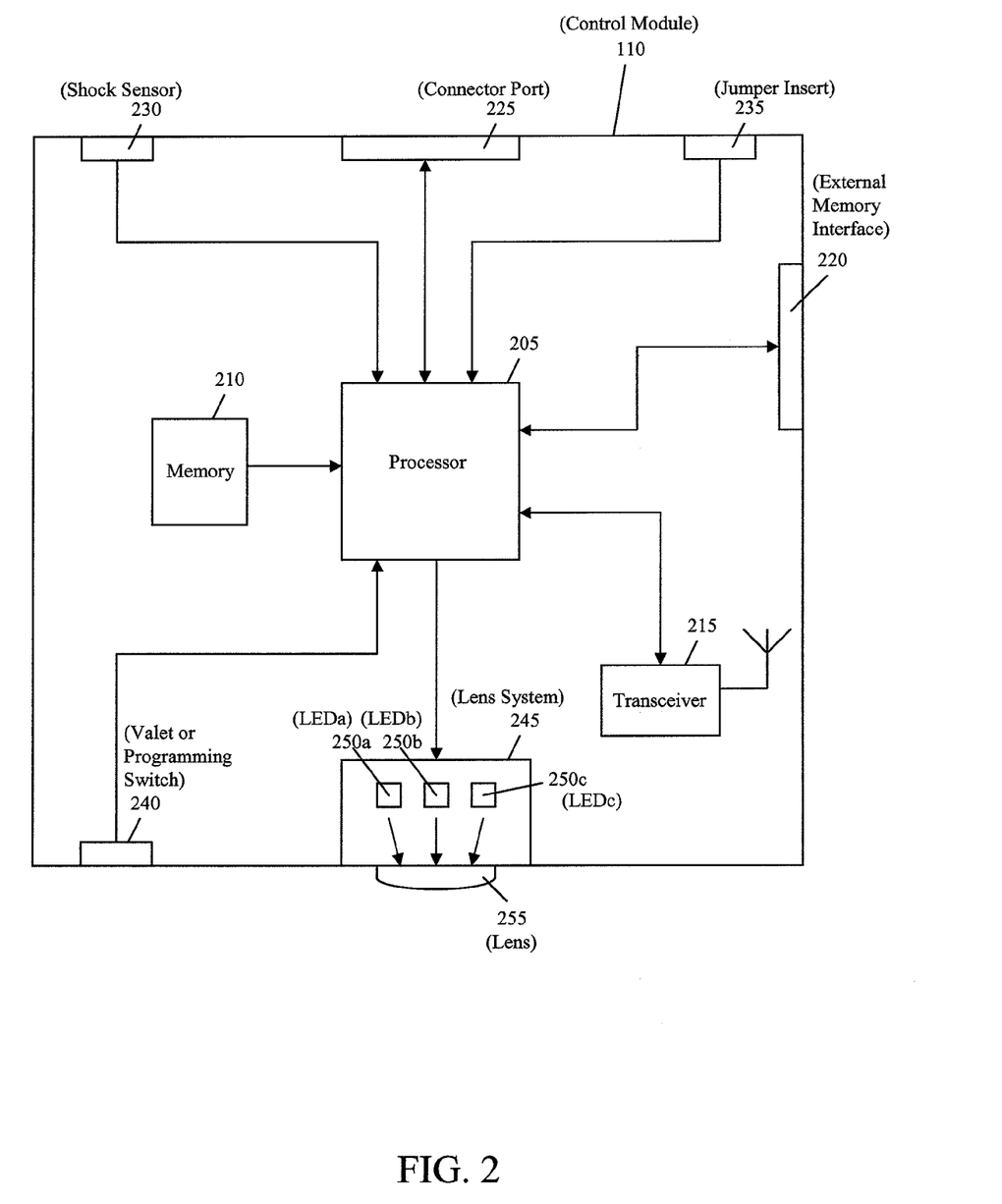
FIG. 2 is a block diagram of a control module of the selectable preload vehicle security system of FIG. 1.

FIG. 2 illustrates the control module 110 in more detail. As shown in FIG. 2, the control module 110 includes a processor 205 coupled to a memory 210, a transceiver 215 coupled to the processor 205, and an external memory interface 220. The control module 110 further includes a connector port 225 for connecting the control module 110 to the function module 120, an adjustable shock sensor 230, a jumper insert 235 and a valet or programming switch 240, all connected to the processor 205. In addition, the control module 110 includes a lens system 245 including several LEDs 250a-c (e.g., red, green and blue) and a lens 255 also connected to the processor 205.

The processor 205 is used to process data provided thereto and controls components of the control module 110. The memory 210 includes a RAM and a ROM. The memory 210 can also include a database, EPROM, EEPROM, SDRAM, DRAM, etc. or a combination thereof. The RAM functions as a data memory that stores data used during execution of a program in the processor 205 and is used as a work area. The ROM functions as a program memory for storing a program executed in the processor 205.

The memory 210 also includes codes for defining a plurality of features of the control module 110. The codes may be used to configure safety, security, and other convenience functions or features related to a vehicle. In addition, the codes may be used to define a feature set of electronically operable functions for other vehicle devices.

The external memory interface 220 is, for example, a memory card interface for enabling the control module 110 to be upgraded with new functions or features associated with the vehicle security system 100. The functions or features of the vehicle security system 100 may be upgraded in such a manner to allow controller area network (CAN) type data packets or similar data packets to be transmitted to and from a vehicle data communications bus.

The external memory interface 220 could also be a USB, Ethernet, FireWire, infrared (IR) or Bluetooth interface for receiving and in some cases requesting updated functions or features to be used by the control module 110. In addition, the external memory interface 220 may be coupled to a camera that can be used to capture images inside and outside of the vehicle during, for example, a crash or theft. This data can be stored in the memory 210 for retrieval or transmitted to an external device via the transceiver 215 for instant analysis.

As further shown in FIG. 2, the connector port 225 may be a four-pin connector capable of interfacing with the data connector 130 for connecting to one or more function modules 120. The connector port 225 may be configured to support ±5 volts, ground, and data transmit and receive lines. The data transmit and receive lines of the connector port 225 are used by the control module 110 to transmit and receive data, thus enabling the control module 110 to communicate control commands to the function module 120.

The three LEDs 250a-c of the lens system 245 may be high-intensity LEDs aimed at the lens 255. The lens 255 may be a prismatic type lens so that when one of the LEDs 250a-c is illuminated it will appear to be centered by fully illuminating the lens 255. The lens system 245 may be used in conjunction with the remote programmer 140 to select or program the function to be performed by the control module 110.

For example, if the control module 110 is programmed by the remote programmer 140 to function as an all-inclusive vehicle security or alarm system the red LED 250a will illuminate. If the control module 110 is to function as an upgrade to an RKE system the green LED 250b will illuminate and if the control module 110 is to function as a shock sensor upgrade to a security or alarm system the blue LED 250c will illuminate. This will enable a person programming the control module 110 to confirm their choice. In addition, the LED associated with the chosen control module 110 function may remain illuminated, thus serving as a visual deterrent when the vehicle security system 100 is active.

As further shown in FIG. 2, the transceiver 215 is compatible with a low range or a full range transmitter. The low range or installation remote transmitter 410, shown for example in FIG. 4, may have a different frequency or identifying characteristic to allow the control module 110 to detect and differentiate a low range transmitter from a full range transmitter and to allow the function of certain features dependent on a feature set selected during installation. The control module 110 or transceiver 215 may have an additional memory means to store and retain the codes or frequencies associated with a low range transmitter or a plurality of full range transmitters, and a means to act upon commands from either the low range or full range transmitters but not from both. The control module 110 or transceiver 215 may have a means, while in a transmitter learn mode, to overwrite any previously stored low range code or frequency upon detection of a low range code or frequency and to store a newly learned low range code or frequency.

The control module 110 or transceiver 215 may have a further means while in the transmitter learn mode, upon detection of a low range code or frequency to render any previously stored long range codes or frequencies inoperative and to respond only to the newly learned low range code or frequency. In addition, the control module 110 or transceiver 215 may have a means, while in the transmitter learn mode, to store the newly received full range code or frequency and to render the previously stored low range code or frequency inoperative upon receipt of a full range code or frequency. Further, the control module 110 or the transceiver 215 may have a means to store a plurality of full range codes or frequencies up to a fixed number in a First-In-First-Out (FIFO) stack order.

The transceiver 215 is further compatible with the remote programmer 140, which includes a keypad 150 and a display 160. As shown in FIG. 1, the remote programmer 140 may be used to wirelessly program the control module 110 or the function module 120. For example, when the control module 110 is in a programming mode, a user may scroll through text on the display 160 by using the keypad 150 to select an operating mode of the control module 110, system features or a dealer code. Once the selections are made, the user may press a "SEND" button and appropriate codes are transmitted to the control module 110 for programming. As further shown in FIG. 1, the remote programmer 140 includes a USB connection port 170 and a smart card media slot 180 for receiving new functions or features to be programmed into the control module 110 or function module 120.

Figure 3:
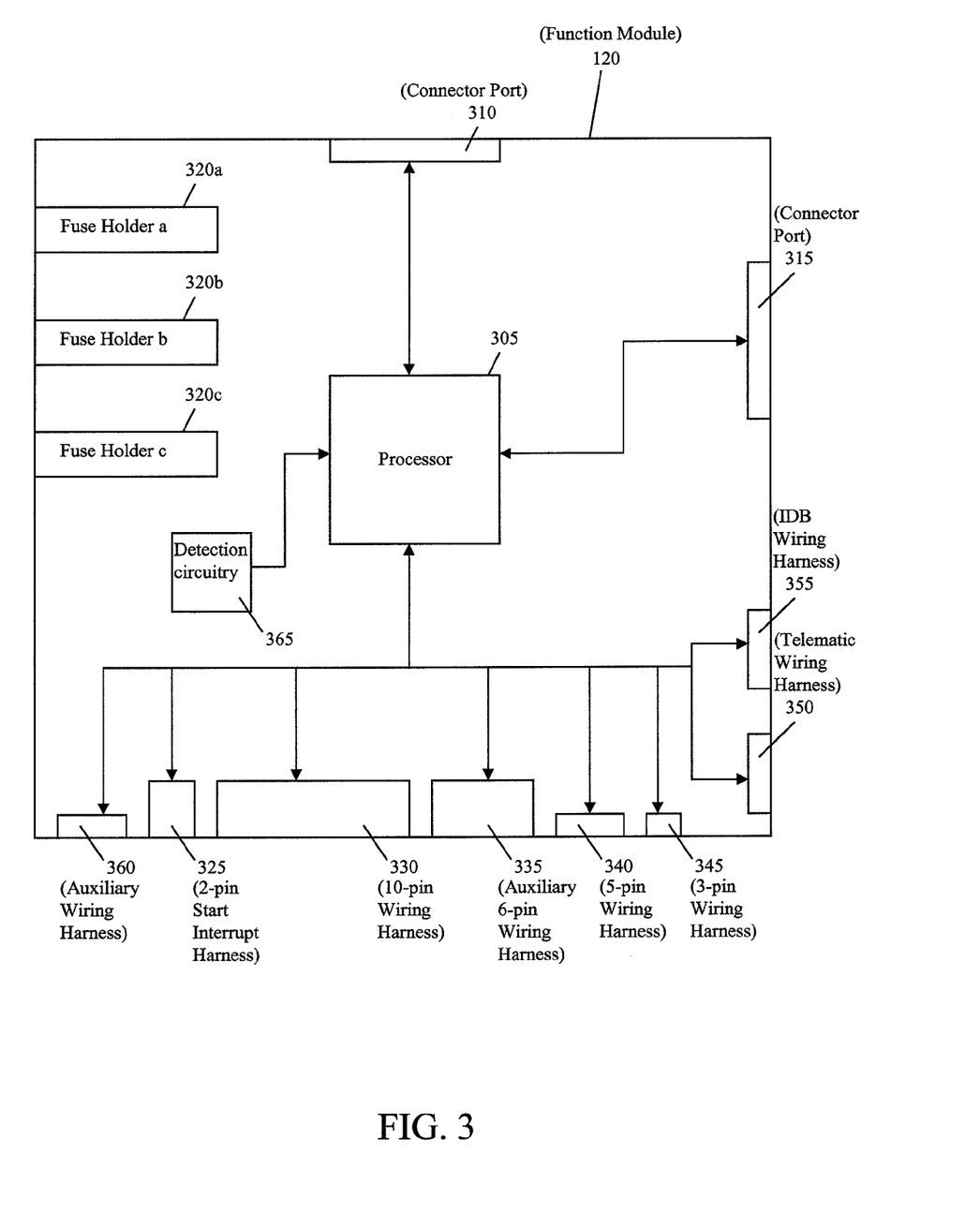
FIG. 3 is a block diagram of a function module of the selectable preload vehicle security system of FIG. 1.

FIG. 3 illustrates the function module 120 in more detail. As shown in FIG. 3, the function module 120 includes a processor 305 for controlling the routing of data transmit commands from the control module 110. The function module 120 also includes a connector port 310 for receiving data from and transmitting data to the control module 110 and a connector port 315 for connecting to an additional vehicle function module 610 (shown, for example, in FIG. 6).

The function module 120 further includes several fuse holders 320*a-c*, a two-pin start interrupt harness 325, a ten-pin wiring harness 330 and an auxiliary six-pin wiring harness 335. The wiring harnesses 325-335 may be used to connect the function module 120 to sundry vehicle devices such as a horn, ignition system, various sensors, door locks and lights. In addition, the ten-pin wiring harness 330 can be used for all control module 110 functions; however, when the control module 110 functions as an upgrade to an RKE system, several pins of the ten-pin wiring harness 330 may not be used.

The function module 120 may also include a light flash relay, starter interrupt relay, and interior illumination relay (none of which are shown) all under control of the processor 305. In addition, the function module 120 includes a five-pin wiring harness 340 for connecting to additional vehicle devices when the control module 120 operates as a shock sensor upgrade to a security or alarm system and a three-pin wiring harness 345 for connecting to additional vehicle devices when the control module 120 operates as an upgrade to an RKE system. The function module also includes a telematic wiring harness 350 for receiving telematic upgrades, an Audiovox IDB wiring harness 355 for connecting to IDB modules offering, for example, trigger inputs, door lock outputs and lighting, and an auxiliary wiring harness 360 for connecting to additional vehicle sensors or devices or for expanding the capabilities of the function module 120. The IDB wiring harness 355 may also be configured so that it can receive card-type IDB modules.

As further shown in FIG. 3, the function module 120 also includes detection circuitry 365 for detecting the complete or partial connection or disconnection of the control module 110 or additional function modules 610. For example, if the vehicle security system 100 is in an armed mode, upon detection of unauthorized disconnection of the control module 110, the function module 120 will cause the vehicle security system 100 to go into a full alert state. Thus, causing the sounding of a device such as a siren or horn or flashing the vehicle lights for a full alarm cycle. After the alarm cycle, the function module 120 or the additional function module 610 can cause the sounding device to emit a tone every five seconds indicating that something is wrong. Further, if the control module 110 is disconnected from the function module 120 when the ignition is turned on, the vehicle security system 100 will cause the sounding device to be triggered for the full alarm cycle while vehicle-starting remains inhibited.

As configured, the function module 120 may serve as an input/output interface having relays and transistors to drive loads associated with the vehicle security system 100. Further, because the function module 120 includes mostly interfaces and a basic processor, it can be manufactured at a lesser cost than the control module 110. Thus, the function module 120 may be left in a vehicle as a sacrificial unit in the event the vehicle security system 100 is not sold.

Figure 6:
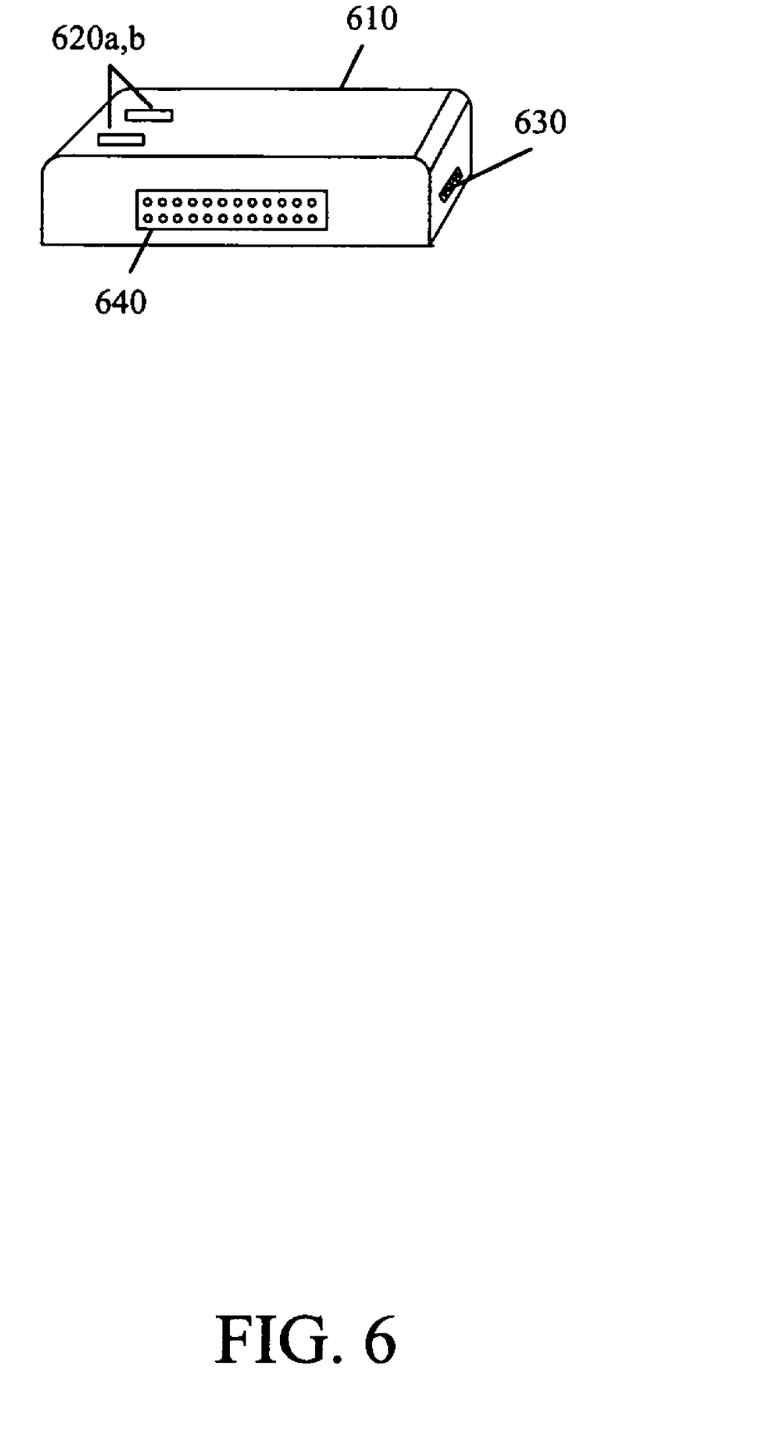
FIG. 6 is a diagram of another exemplary embodiment of the function module of FIG. 1.

It is to be understood that the additional vehicle function module 610 may be the same as or similar to the function module 120. For example, the additional vehicle function module 610 may include fuse holders 620*a,b*, a connector port 630 for connecting to further vehicle function modules and a wiring harness 640 for connecting to vehicle devices.

Referring back to FIG. 1, the control module 110 is a multi-mode device. In particular, the control module 110 is programmable to function as one of three or more modules. For example, the control module 110 may be programmed to function as an all-inclusive vehicle security or alarm system, an upgrade to an RKE system or as a shock sensor upgrade to a security or alarm system. The functionality of the control module 110 is selected by using the remote programmer 140. The functionality of the control module 110 may also be selected by using the installation remote 410.

Figure 4:
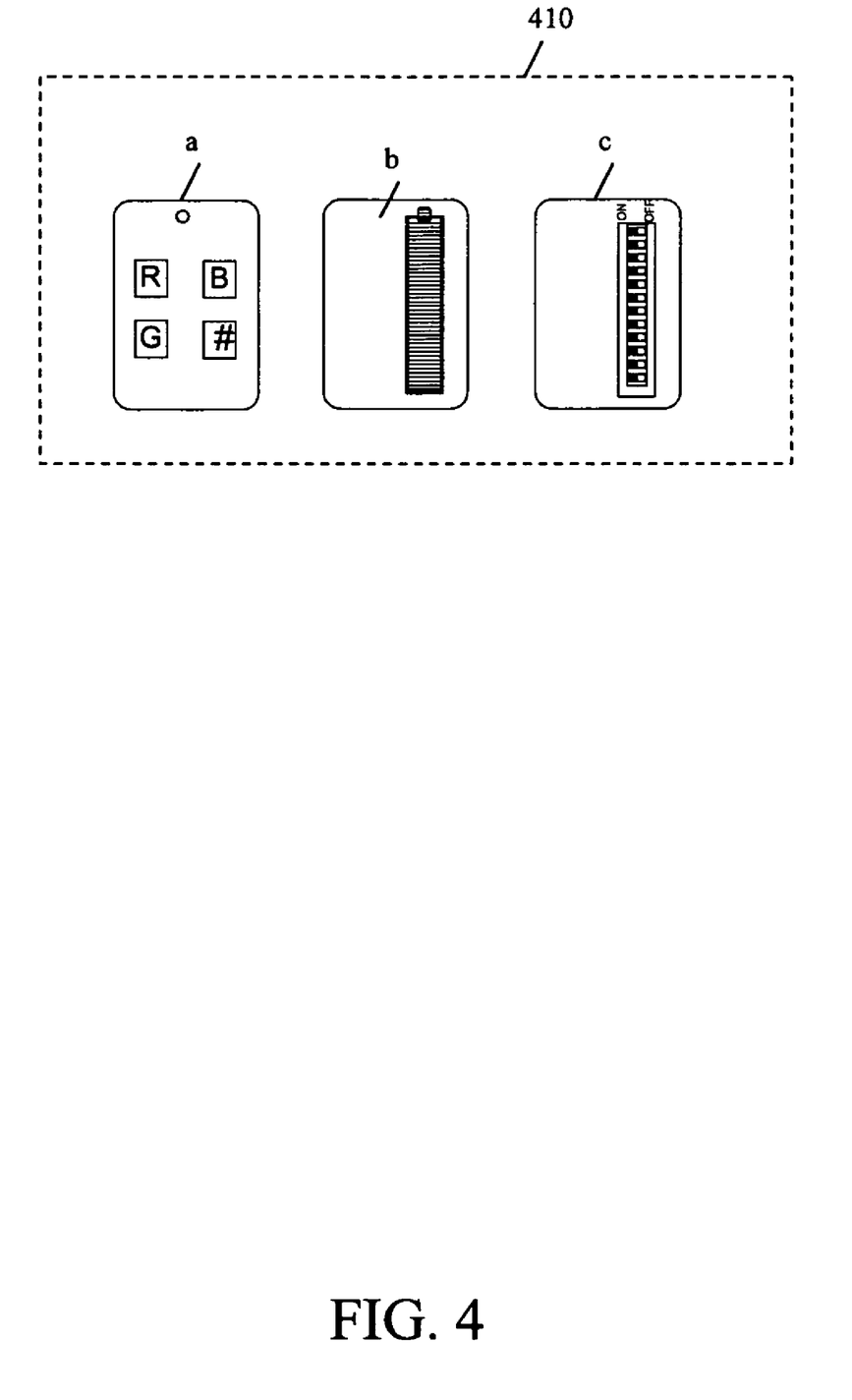
FIG. 4 is a diagram of a remote transmitter of the selectable preload vehicle security system of FIG. 1.

As shown in FIG. 4, the installation remote 410 may be, for example, a 434 MHz low range remote transmitter or receiver employing code hopping and for use with a SAW resonator. The remote programmer 140 may also be a 434 MHz low range remote transmitter or receiver employing code hopping and for use with a SAW resonator. The installation remote 410 may have 12 dip-switches 410*c* used to select a dealer code. The installation remote 410 further includes four buttons (e.g., R, G, B and #) 410*a*. The # button is used to transmit a selected dealer code to the control module 110 and the R, G and B buttons, which may be colored, are used to program the functionality or personality of the control module 110.

The following Table illustrates an example of the feature set stored in the memory 210 of the control module 110 that may be configured or enabled using the remote programmer 140 or installation remote 410.

TABLE

| Feature Selection | LED Flash | 1 Chirp | 2 Chirp | 3 Chirp | 4 Chirp | 5 Chirp | 6 Chirp | Default | Access By |
|---|---|---|---|---|---|---|---|---|---|
| 1 Accy Lock | 1X etc... | On | Off | | | | | On | Consumer |
| 2 Accy Unlock | 2X etc... | Dr. | All | None | | | | On | Consumer |
| 3 Passive Lock | 3X etc... | On | Off | | | | | Off | Consumer |
| 4 Passive/Active Arm | 4X etc... | Passive | Active | | | | | Active | Consumer |
| 5 Lock/Unlock Duration | 5X etc... | 350/800 | 400/400 | 600/600 | 800/800 | Dbl 800/Dbl 800 | 3.5/3.3 | 800/800 | Tech Only |
| 6 Output Device Siren/Horn | 5X etc... | Siren | Horn | Both | | | | Horn | Tech Only |
| 7 Arm Defect Chirp | 6X etc... | 1 Chirp | 3 Chirp | Learn | | | | | Tech Only |
| 8 Selective Unlocking | 7X etc... | 1 Step | 2 Step | Type 2 | | | | 1 Step | Tech Only |
| 9 Dome Light Fade On Armed | 9X etc... | Off | 60 Sec | Learn | | | | | Tech Only |
| 10 Arm/Disarm Chirp Duration | 10X etc... | 10 mS | 16 mS | 30 mS | 40 mS | 50 mS | | 16 | Tech Only |
| 11 Alarm Trig. Duration (G Only) | 11X etc... | 1 Sec | 2 Sec | 3 Sec | | | | 1 Sec | Tech Only |
| 12 Factory Arm/Disarm G | 12X etc... | On | Off | | | | | On | Tech Only |
| 13 Input Poll (B Only) | 13X etc... | 80 mS | 120 mS | | | | | 120 mS | Tech Only |
| 14 Dealer Mode Chirp | 14X etc... | Lock & Unlock | Unlock Only | None | | | | None | Tech Only |
| 15 Dealer Mode LED | 15X etc... | On | Off | | | | | On | Tech Only |
| 16 Dealer Mode Lock/Unlock | 16X etc... | On | Off | | | | | On | Tech Only |

As shown in the Table, the functions associated with a particular personality of the control module 110 will be selectable while toggling through the Table. In other words, if the control module's 110 personality is associated with the red LED 250a and as you are scrolling along the feature set you reach feature 13, because feature 13 is not associated with the red LED 250a but rather the blue LED 250c, the red LED 250a will flash a number of times indicating that the setting cannot be altered.

Figure 7:
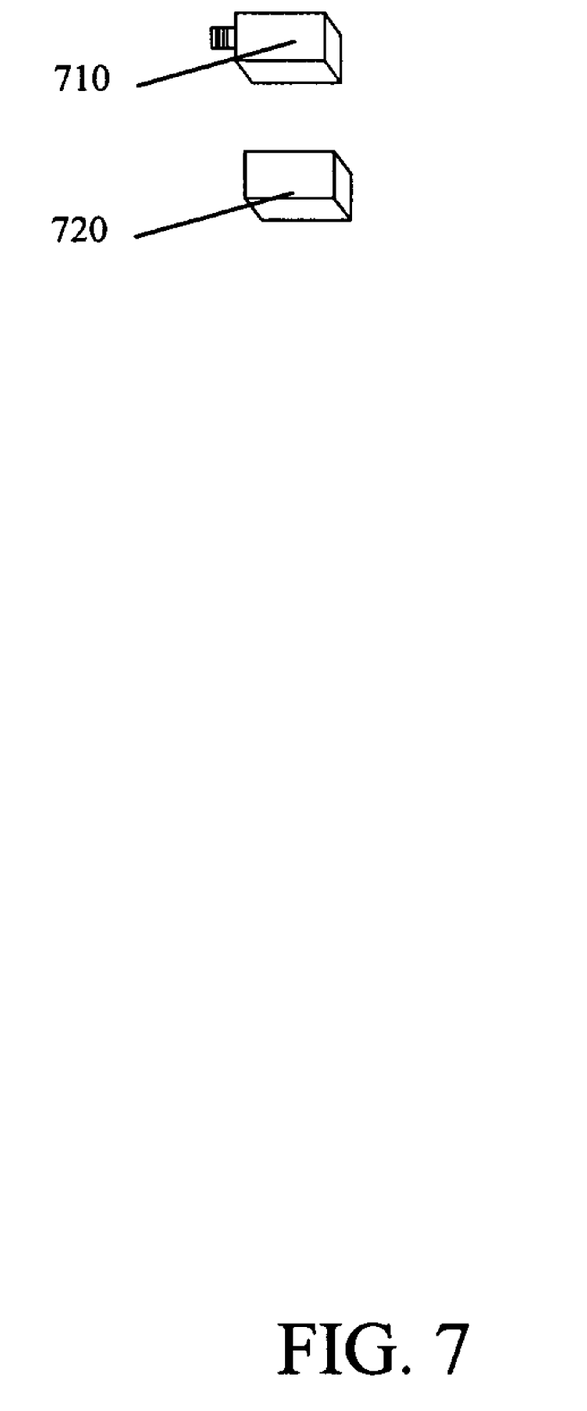
FIG. 7 is a diagram of a pair of jumpers for use with the control module of FIG. 2.

After the personality of the control module 110 has been selected and programmed, one of the LEDs 250a-c corresponding to the selected personality will illuminate thus confirming the choice and allowing, for example, 15 seconds for a user to either change the control module's 110 personality or confirm that the choice is correct by pressing the same button again. This action will thus "lock-in" the personality of the control module 110. Once the personality is "locked-in", the control module 110 may begin to emit tones until either a low range dealer code is programmed or a consumer jumper 710, shown for example in FIG. 7, is inserted into the jumper insert 235 and the control module 110 is then re-programmed to operate in a consumer mode.

Upon programming the dealer code, the control module 110 and the vehicle security system 100 will operate in a limited pre-programmed dealer feature set mode. Thus, there may be no interior vehicle illumination, no parking light flashes, and no siren chirps unless otherwise programmed. In addition, the LEDs 250a-c will function normally, yet there may be no valet or manual override modes. Further, the control module 110 may be passively armed at all times 30 seconds after the vehicle ignition is turned off. While in the dealer mode when the control module 110 is disarmed, all functions and features may be accessible for programming. However, when in the consumer mode, only the first four features of the control module 110 may be available. The consumer also has access to the adjustable shock sensor 230, which includes an adjustable potentiometer, on the control module 110.

As shown in FIG. 1, the control module 110 will turn on one of the LEDs 250a-c when the vehicle security system 100 is disarmed for ten seconds or until the ignition key is turned on. This feature is to inform the dealership salesperson of the desired functionality of the control module 110, thus enabling the salesperson to select a corresponding jumper plug and insert it into the jumper insert 235. It is to be understood that color-coded jumper plugs could be designed such that they each correspond to a different functionality of the control module 110. Thus, in operation, a red jumper plug could be associated with the all-inclusive vehicle security or alarm system functionality and a green jumper plug could be associated with the RKE system upgrade functionality.

If the control module 110 is not sold to a consumer, the vehicle security system 100 can be deactivated by inserting a blanking jumper into the jumper insert 235 of the control module 110. This is accomplished by first disarming the vehicle security system 100, inserting a blanking jumper into the jumper insert 235, and then removing the control module 110. When the control module 110 is removed in the proper manner, the function module 120 is put into a valet mode.

If the control module 110 is not removed in the proper manner, the vehicle security system 100 will go into a tamper alert mode. The tamper alert mode is as follows. First, the vehicle security system 100 will trigger for a full trigger duration mode, for example, 30 seconds if all entry points are inactive, or for a full three minutes if any trigger zone in the vehicle is active, thus isolating the active zone. The trigger zones may be associated with the vehicle doors, trunk hood and ignition. These zones will continue to trigger until the control module 110 is reconnected to the function module 120. If the function module 120 is not in a triggered state, it will go into a limp mode whereby the function module 120 will emit a beep tone every five seconds until the control module 110 is reconnected.

If the control module 110 is sold to the consumer, the dealership salesperson will disarm the vehicle security system 100, observe one of the illuminated LEDs 250*a-c* and insert the jumper corresponding to the illuminated LED. Once the jumper is inserted, the control module 110 will emit a beep tone similar to the one emitted by the function module 120 during the limp mode. The beep tone will be emitted, for example, until a consumer transmitter is programmed for the red LED 250*a*, until the ignition key is cycled for the green LED 250*b* or until a factory transmitter is activated for the blue LED 250*c*. These steps complete the consumer activation mode.

If, however, the consumer jumper 710 is removed after activation, the control module 110 will go into a beep mode and beep every five seconds until the consumer jumper 710 is reinserted. At this point, the control module 110 may be reclaimed by the dealer by programming it using the installation remote 410 or by properly disabling the control module 110 with a blanking or disable jumper 720 as shown in FIG. 7.

Figures 8, 8A:
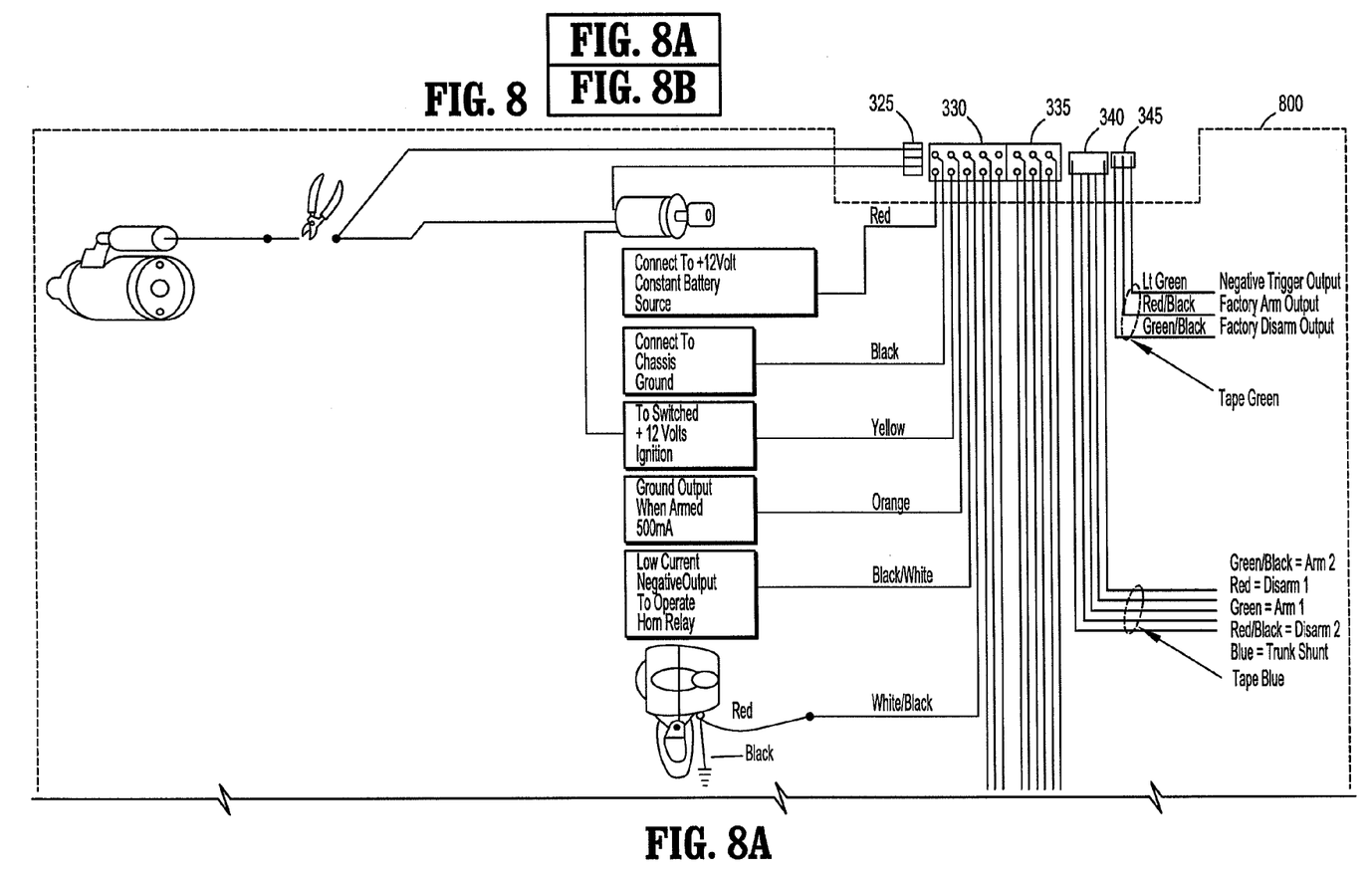
FIG. 8 is a diagram of wiring harnesses of the function module of FIG. 3 coupled to a plurality of vehicle devices according to an exemplary embodiment of the present invention.
Figure 8B:
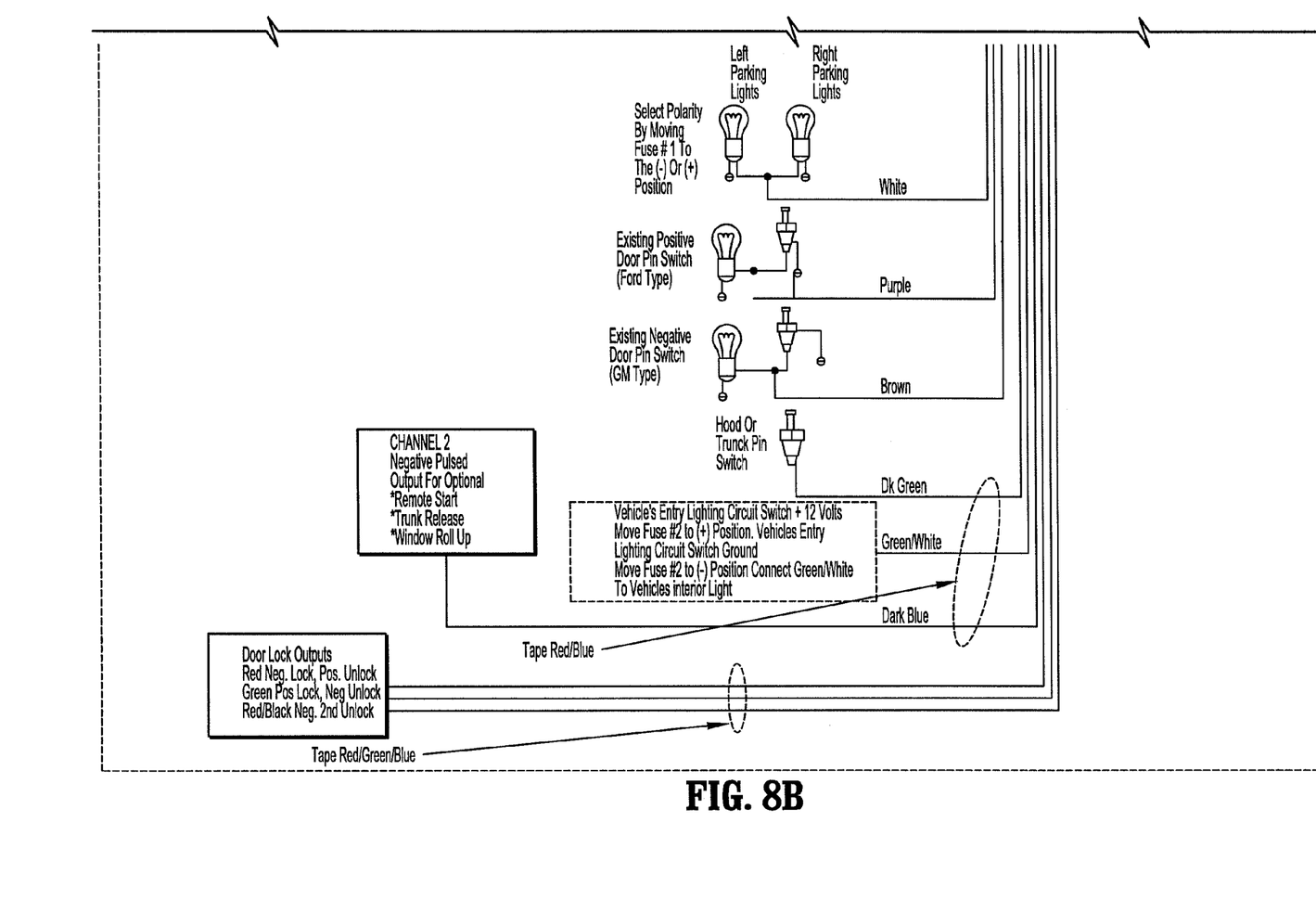

After the control module 110 and function module 120 of vehicle security system 100 are connected to internal vehicle components 800 as shown, for example, in FIG. 8, the vehicle security system 100 may be powered. Upon powering, the LEDs 250*a-c* will sequentially flash indicating that the control module 110 has not been characterized. This will prompt the installer to program the personality of the control module 110 using the remote programmer 140 or the installation remote 410. In order to program the control module 110, the ignition key is turned on and the valet switch 240 is pressed and released three times, and the ignition key is turned off.

Upon turning the ignition key off, the control module 110 chirps indicating that it is ready to accept a code from the installation remote 410. The installer will then press one of the R, G or B transmitter buttons 410*a* depending on which functionality the control module 110 is to have. The corresponding LED 205*a-c* will then illuminate and remain on. At this point, the installer can continue onto feature programming, or if default feature settings are acceptable, the ignition key can be turned off. Once the ignition key is turned off, the illuminated LED, which may be dependent on feature 15 shown in the Table, will respond accordingly.

Now that the personality of the control module 110 has been selected, the control module 110 will emit a beep tone until either a dealer code transmitter is programmed or the consumer jumper 710 is inserted into the jumper insert 235 and an action associated with a red jumper or LED 250*a* such as adding consumer transmitters, an action associated with a green jumper or LED 250*b* such as cycling the ignition switch and an action associated with a blue jumper or LED 250*c* such as operating a consumer transmitter may be performed. If after personality programming, the feature selection mode is entered, and thereafter, there will not be another chance to select the personality of the control module 110 without repeating an initial set up or additional steps required to select the personality. In addition, the personality selection may only be available immediately after powering the vehicle security system 100, after which the feature selection mode is entered.

When the vehicle security system 100 is in the dealer mode, while it is in a vehicle on a dealer lot, by operating the low-range installation transmitter 410, the vehicle security system 100 may operate as discussed below. The control module 110 may follow all pre-defined dealer mode features such as passive arm, no valet or override modes, no parking light flash and no interior illumination. Lock chirps and LED 250*a-c* lighting will be as per feature selection. In addition, one or all of the LEDs 250*a-c* may turn on for ten seconds or until the ignition key is turned on with each disarm so that a dealer salesperson knows what type of vehicle security system 100 is installed and to ensure that a correct jumper is inserted when the vehicle security system 100 is sold to a consumer.

If the vehicle security system 100 is not sold to a consumer, the dealer salesperson will have to remove the control module 10. As previously discussed, the salesperson would first disarm the vehicle security system 100 after which they would connect the blanking jumper 720. Once the blanking jumper 720 is connected, the vehicle security system 100 may simultaneously turn on the LED's 250*a-c* for ten seconds after which the LED's 250*a-c* will turn off indicating that it is safe to remove the control module 100. The ten-second window allows the salesperson who perhaps connected the wrong jumper to remove the jumper without altering the personality of the control module 110.

If the above procedure is not followed, the vehicle security system 100 will act as if a theft of the control module 100 has occurred. The vehicle security system 100 will first trigger and run the full alarm cycle course, for example, for the red and blue personalities of the control module 110, followed by a beeping every five seconds when it is not triggered until the control module 110 is reconnected or properly disabled. While in the unauthorized mode and before the control module 10 is reconnected, the trigger points, for example, trunk hood, doors and ignition may still be available.

Once the control module 110 is removed from the vehicle, it will be returned to its distributor or manufacturer and the blanking jumper 720 can be removed. The control module 110 can then be reprogrammed to a make it a non-selected system allowing the control module 110 to be recycled and installed into another vehicle comprising the vehicle security system 100. Recycling the control module 110 can include a process that allows the control module's 110 firmware to be updated with enhanced or upgraded feature sets or capabilities thereby preventing the control module's 110 obsolescence.

Figure 5:
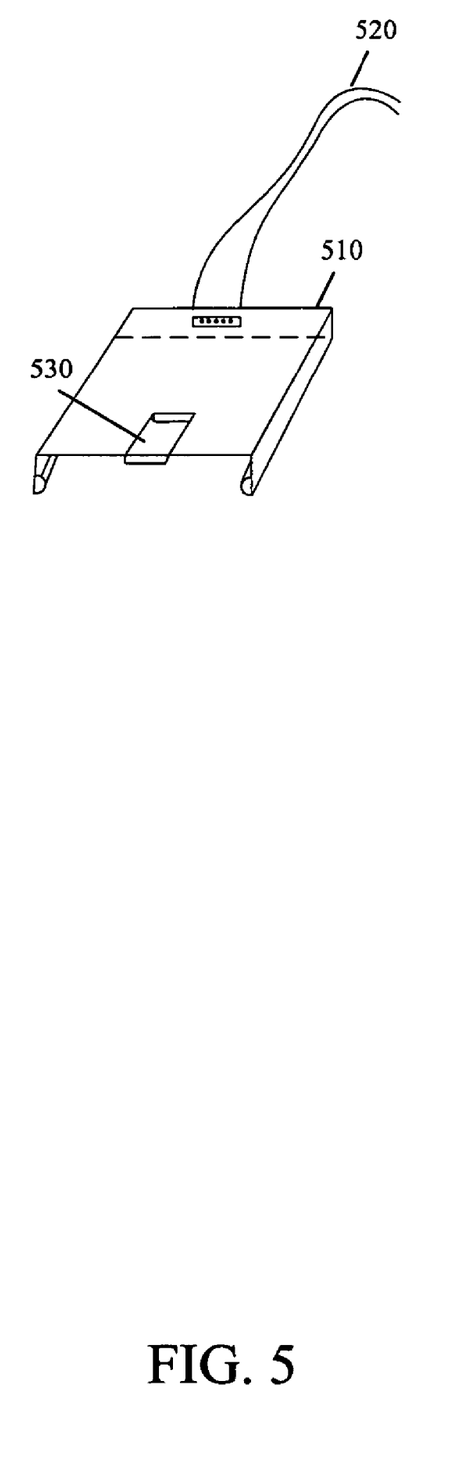
FIG. 5 is a diagram of a storage bracket according to an exemplary embodiment of the present invention.

In an alternative embodiment of the present invention, the function module 120 and storage bracket 510 may be installed by the vehicle manufacturer. The storage bracket 510 may include a quick release/locking mechanism 530 and a connector 520 for connecting the control module 110 to the function module 120. In the alternative embodiment, the control module 110 can be purchased by the vehicle dealership and inserted into the storage bracket 510, thus eliminating the need for the vehicle dealership to install the entire vehicle security system 100. Moreover, the entire vehicle security system 100 may be installed by the manufacturer and if the vehicle security system 100 is not sold, the control module 110 can be removed and either kept by the vehicle dealer and implemented into another vehicle security system 100 or returned to the vehicle manufacturer. Thus, the control module 110 that was not sold may be re-used by the vehicle manufacturer.

In another alternative embodiment of the present invention, additional function modules 610 can have an additional connector capable of communicating with a terrestrial data link to, for example, an Audiovox Posse unit. Therefore, in the event the control module 110 is tampered with, the additional function module 610 can inform the vehicle owner of the situation and still provide theft deterrent functions, even if the control module 110 is not connected to the additional function module 610.

Thus, according to an exemplary embodiment of the present invention, the selectable preload vehicle security system can be installed in every vehicle on the dealer lot. The system may be programmed and selected to operate from a plurality of system choices for a particular vehicle type offering a control module that can be programmed to operate as different systems based on a desired application. The system may also able to operate from a commonly coded dealer transmitter for use while on the dealer lot and before it is sold to a consumer. One or more of the features may be inhibited from functioning while the dealer transmitter is employed. However, once the vehicle is sold, a consumer transmitter may be programmed and full access to all the features of the system are available.

The vehicle security system may be easily sold through a dealer finance office. However for the systems that are not sold, the control module can be easily removed by a salesman, thus recovering the more expensive component and eliminating the cost of having an alarm technician available at the dealer lot just to remove the systems that do not sell. In addition, only one control module needs to be stocked because the control module can be programmed to employ characteristics of many systems, for example, alarm, keyless entry, alarm upgrade or alarm remote start. Further, the control module may be designed so that it is aesthetically pleasing and ergonomically fitting for all vehicle types.

It is to be understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It is to be further understood that the present invention may be implemented in various forms of hardware, software, firmware, special purpose processors, or a combination thereof. In one embodiment, the present invention may be implemented in software as an application program tangibly embodied on a program storage device (e.g., magnetic floppy disk, RAM, CD ROM, DVD, ROM, and flash memory). The application program may be uploaded to, and executed by, a machine comprising any suitable architecture.

It should also be understood that the above description is only representative of illustrative embodiments. For the convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be straightforwardly implemented without departing from the spirit and scope of the present invention.

It is therefore intended that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A multi-mode vehicle security system, comprising:
   a control module wirelessly selectable to operate in one of a plurality of modes, wherein said plurality of modes include a first mode in which the control module functions as a vehicle security system, a second mode in which the control module functions as an upgrade to a remote keyless entry (RKE) system, or a third mode in which the control module functions as a shock sensor upgrade to a vehicle security system; and
   a function module for receiving a command from the control module and instructing a vehicle device to perform a function associated with the command,
   wherein when the control module operates in one of the first, second or third modes, the control module is restricted from operating in the other mode or modes.

2. The vehicle security system of claim 1, further comprising: a remote controller for selecting an operating mode of the control module.

3. A control module for use with a vehicle security system, the control module comprising:
   an indicator for indicating an operating mode of the control module;
   a memory comprising codes associated with a plurality of features of the control module; and
   a transceiver for receiving an instruction to operate the control module in one of a plurality of modes, said plurality of modes including a first mode in which the control module functions as a vehicle security system, a second mode in which the control module functions as an upgrade to a remote keyless entry (RKE) system or a third mode in which the control module functions as a shock sensor upgrade to a vehicle security system, and for receiving programming information defining a plurality of features of the control module,
   wherein, when the instruction, which comprises a selection to operate the control module in one of the first, second or third modes, is received, the control module is restricted from operating in the other mode or modes.

4. The control module of claim 3, wherein the indicator is a lens system comprising a plurality of LEDs.

5. The control module of claim 3, wherein the memory is one of an EPROM, EEPROM, RAM, SDRAM or DRAM.

6. The control module of claim 3, further comprising:
   a connecting port for connecting the control module to a function module, wherein the function module is connected to a plurality of vehicle devices.

7. The control module of claim 6, wherein the memory further comprises codes associated with a plurality of features of the function module and the vehicle devices.

8. The control module of claim 3, further comprising:
   an adjustable shock sensor.

9. The control module of claim 3, further comprising:
   a jumper insert; and
   a programming switch.

10. The control module of claim 9, wherein when an ignition key of a vehicle is turned on and the programming switch is pressed and released, and then, the ignition key is turned off, the control module is capable of being programmed.

11. The control module of claim 10, wherein when a first jumper, which is associated with the operating mode of the control module is inserted into the jumper inserts, the control module is programmed in response to the programming information.

12. The control module of claim 9, wherein when a second jumper is inserted into the jumper insert the control module is deactivated.

13. The control module of claim 3, further comprising:
an external memory interface for receiving programming information defining a plurality of features of the control module and the function module.

14. A selectable and programmable preload vehicle security system, comprising:
a control module wirelessly selectable to operate in one of a plurality of modes, said plurality of modes including a first mode in which the control module functions as a vehicle security system, a second mode in which the control module functions as an upgrade to a remote keyless entry (RKE) system or a third mode in which the control module functions as a shock sensor upgrade to a vehicle security system, and programmable in response to programming information defining a plurality of features of the control module; and
a first function module for receiving commands from the control module and instructing vehicle devices to perform functions associated with the commands,
wherein when the control module operates in one of the first, second or third modes, the control module is restricted from operating in the other mode or modes.

15. The vehicle security system of claim 14, further comprising:
a remote controller for selecting an operating mode of the control module and for programming a plurality of features of the control module and the first function module.

16. The vehicle security system of claim 14, wherein the first function module comprises:
a first connector port for receiving data from and transmitting data to the control module;
a second connector port for connecting the first function module to a second function module; and
a plurality of wiring harnesses for connecting the first function module to the vehicle devices.

17. The vehicle security system of claim 16, further comprising:
a detection circuit for detecting a complete or partial connection or disconnection of the control module or the second function module to or from the first function module.

18. The vehicle security system of claim 16, further comprising:
a telematic wiring harness for receiving telematic upgrades; and
an intelligent transportation system data bus (IDB) wiring harness for connecting to an IDB module.

19. The vehicle security system of claim 14, further comprising:
a storage bracket for securing the control module inside a vehicle.

* * * * *